July 23, 1968    H. MEMBRINO    3,393,493
BAG-MAKING MACHINE
Original Filed Aug. 16, 1963    6 Sheets-Sheet 1

Inventor
HERCULES MEMBRINO
By Arthur A. Jacobs
Attorney

HERCULES MEMBRINO

July 23, 1968

H. MEMBRINO 3,393,493

BAG-MAKING MACHINE

Original Filed Aug. 16, 1963

Inventor
HERCULES MEMBRINO

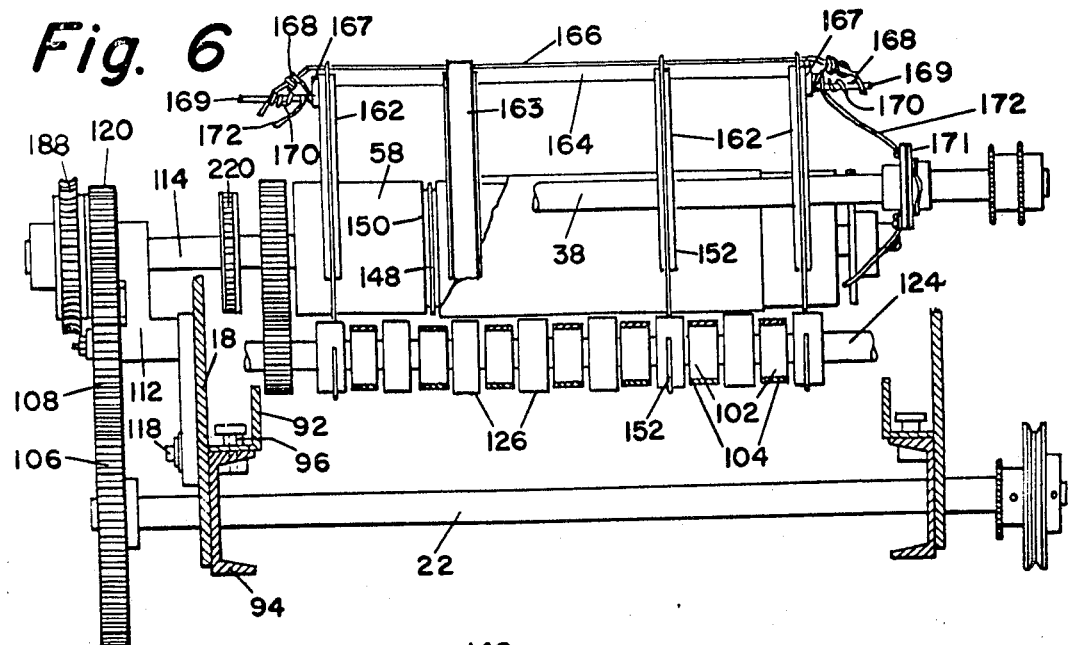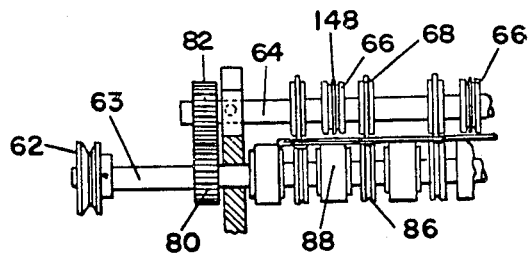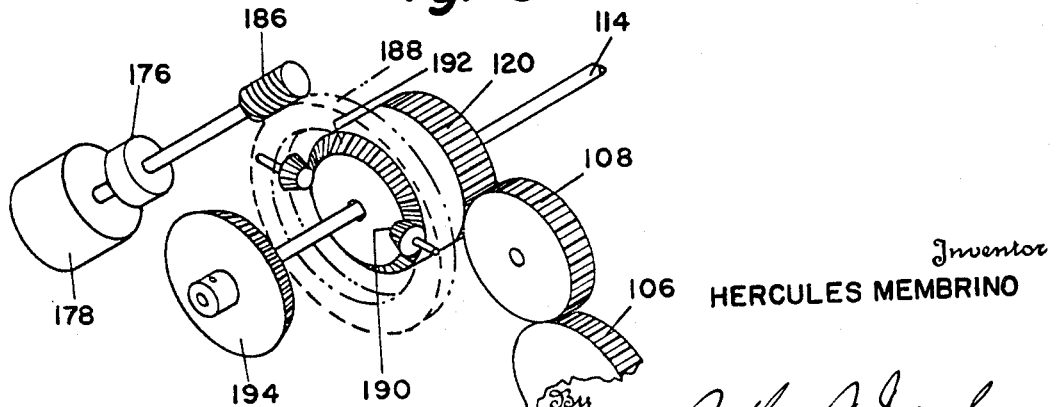

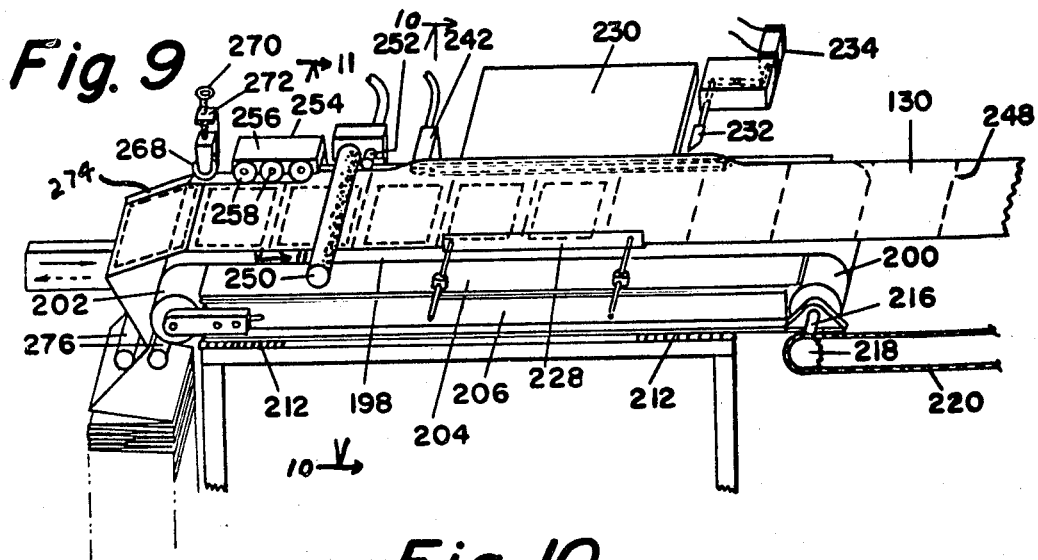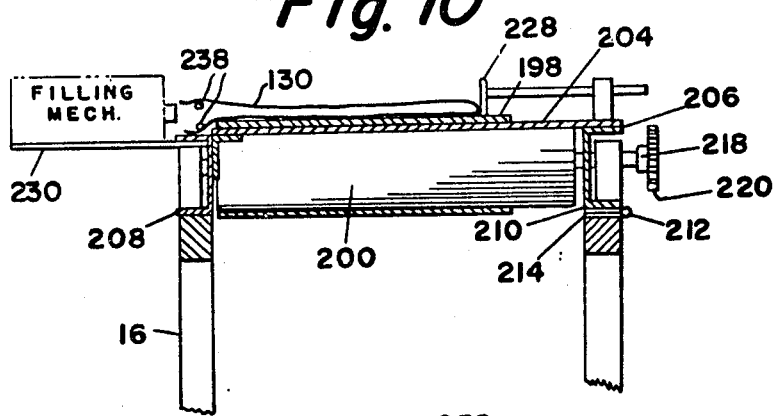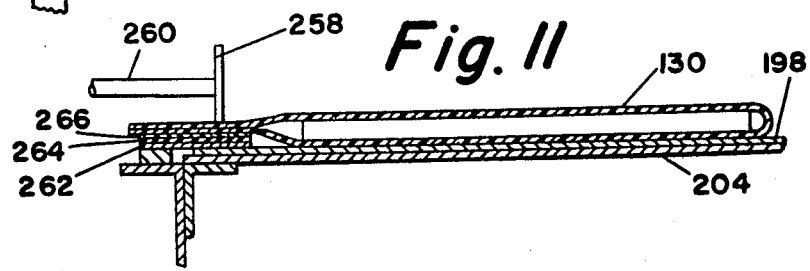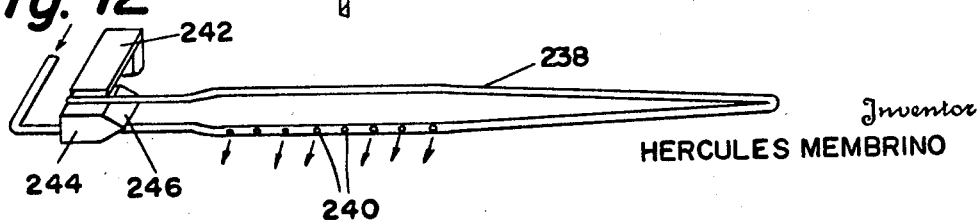

July 23, 1968
H. MEMBRINO
3,393,493
BAG-MAKING MACHINE
Original Filed Aug. 16, 1963
6 Sheets-Sheet 3
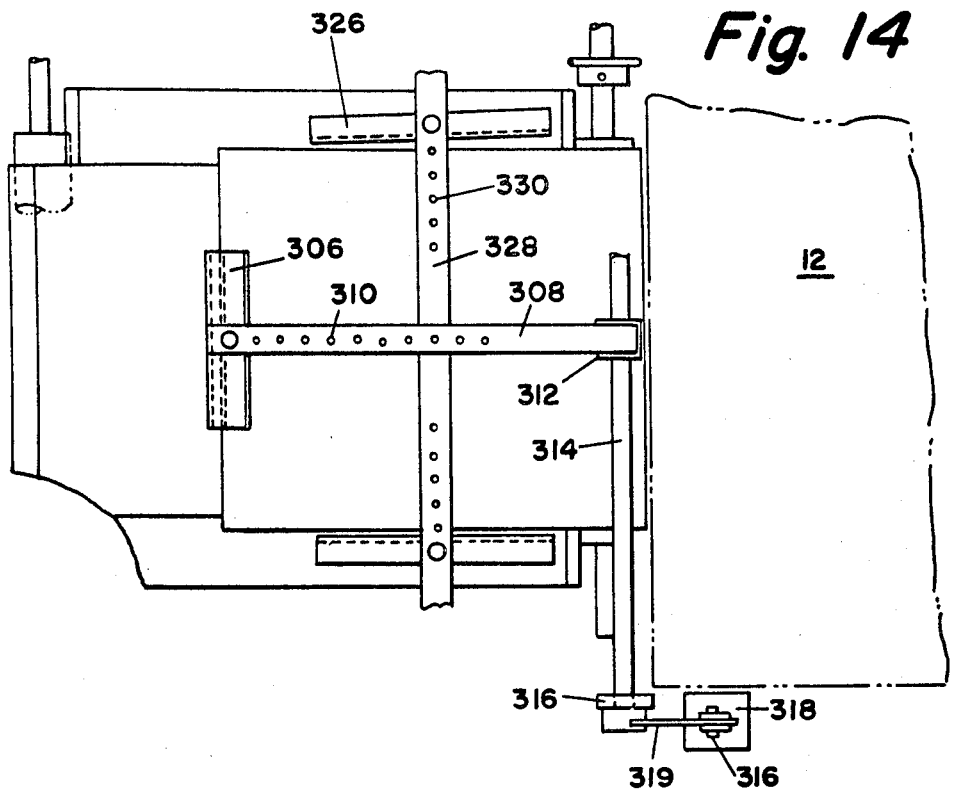
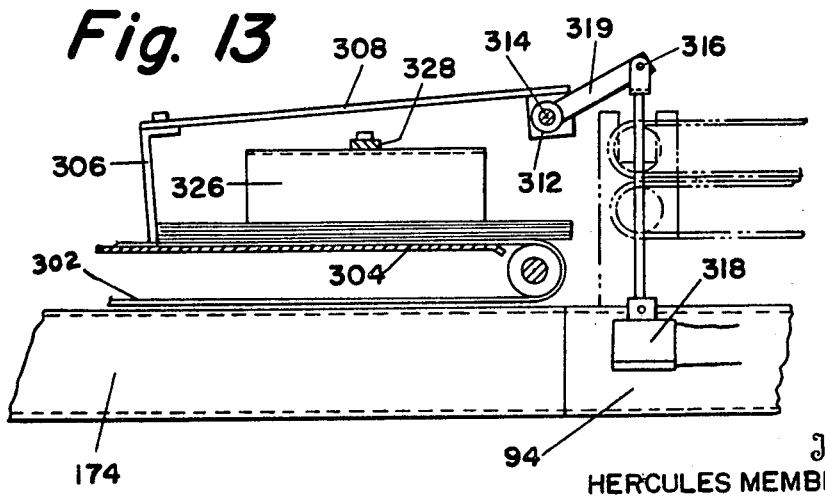
Inventor
HERCULES MEMBRINO
By Arthur Jacobs
Attorney

United States Patent Office 3,393,493
Patented July 23, 1968

3,393,493
BAG-MAKING MACHINE
Hercules Membrino, 1934 Arch St.,
Philadelphia, Pa. 19103
Original application Aug. 16, 1963, Ser. No. 302,521, now Patent No. 3,233,527. Divided and this application Oct. 15, 1965, Ser. No. 496,369
7 Claims. (Cl. 53—183)

ABSTRACT OF THE DISCLOSURE

A bag-making machine comprising a support structure supporting a single rotatable heat sealing and cutting element backed by a rotatable impression roller, the heat sealing and cutting element adapted to form lines of seal with spaced interruptions in a double ply thermoplastic strip as the strip moves from a supply roll. The interruptions form connecting means between the bags formed from the strip by the heat sealing and cutting element. As the connected bags continue to move through the machine, they pass a filling station where a filler is inserted sidewise between the sealed edges of the bags. If the strip has two overfolded plys, there is a side opening for the filler, but if the strip is tubular, a cutting means is provided at the filling station to automatically cut an opening just before the filler is inserted. There is also preferably a spreading means, including a blower adapted to blow air into the bags, for spreading the lips of the side opening prior to insertion of the filler.

---

This invention relates to a machine for making bags, and it particularly relates to a machine for making bags of thermoplastic polyolefin materials such as polyethylene, polypyropylene, polyvinyl alcohol, polyvinyl acetate, etc.

This is a division of applicant's co-pending application Ser. No. 302,521, filed Aug. 16, 1963.

Plastic bags are assuming an ever greater popularity for a variety of different uses such as the packaging of shirts and other clothing, the packaging of loose items such as nuts and bolts, the use in the home for wrapping sandwiches, baked goods, meats, frozen foods and other similar items, and many other uses too numerous to enumerate.

In order to meet the increasing popular demand at an acceptable price, it has become necessary to produce these bags in the most economical and rapid manner possible. This necessitates the utilization of a machine which is capable of continuous and rapid operation and which can be operated by unskilled or at the most only semiskilled labor.

It is one object of the present invention to provide a machine which fulfills all of the aforesaid requirements of easy, rapid and economical operation.

Another object of the present invention is to provide a machine of the aforesaid type which is equally adapted to work continuously or intermittently.

Another object of the present invention is to provide a machine of the aforesaid type which is capable of easy adjustment to operate on bags of different sizes.

Another object of the present invention is to provide a machine of the aforesaid type which is adapted to work on raw stock of either the tubular or laminated sheet type.

Another object of the present invention is to provide a machine of the aforesaid type which is adapted to fill the bags while they are being made.

Other objects and many of the attendant advantages of this invention will be readily appreciated as the same becomes better understood by reference to the following description when read in conjunction with the accompanying drawings wherein:

FIG. 6 is a sectional view, with parts broken away, taken on line 6—6 of FIG. 5.

FIG. 7 is a fragmentary sectional view taken on line 7—7 of FIG. 5.

FIG. 8 is an exploded perspective view showing the differential gear mechanism for controlling the positions of the bags in the machine as they pass therethrough.

FIG. 9 is an enlarged, detailed, top perspective view of the portion of the machine which is situated at the left in FIG. 1.

FIG. 10 is a sectional view taken on line 10—10 of FIG. 9.

FIG. 11 is a cross-sectional view taken on line 11—11 of FIG. 9.

FIG. 12 is an enlarged, detailed, side elevational view of the bag opening and nipping means shown in FIG. 9.

FIG. 13 is a fragmentary, side elevational view showing a modification of the machine wherein it is used to form separate bags arranged in stacks.

FIG. 14 is a top plan view of the mechanism of FIG. 13.

Figure 1:
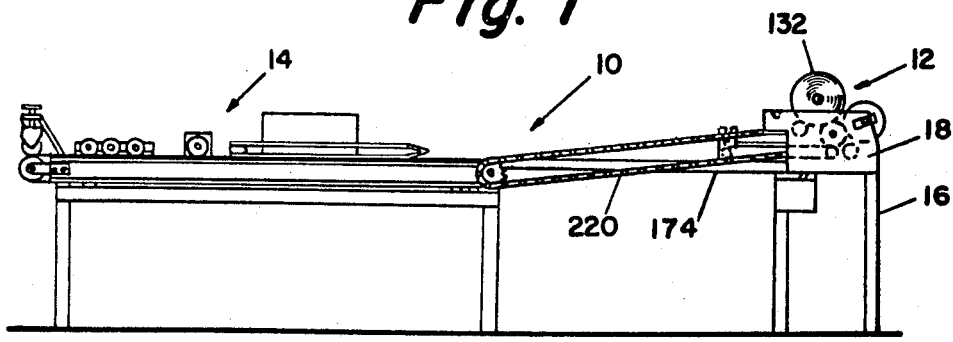
FIG. 1 is a side elevational view of a machine embodying the present invention.

Referring now in greater detail to the various figures of the drawings wherein similar reference characters refer to similar parts, there is shown in FIG. 1 an assembly view of the preferred embodiment of the invention, the entire assembly being generally designated 10. The assembly 10 comprises an initial forming mechanism, generally designated 12, and a filling, finishing and stacking mechanism, generally designated 14.

Figure 2:
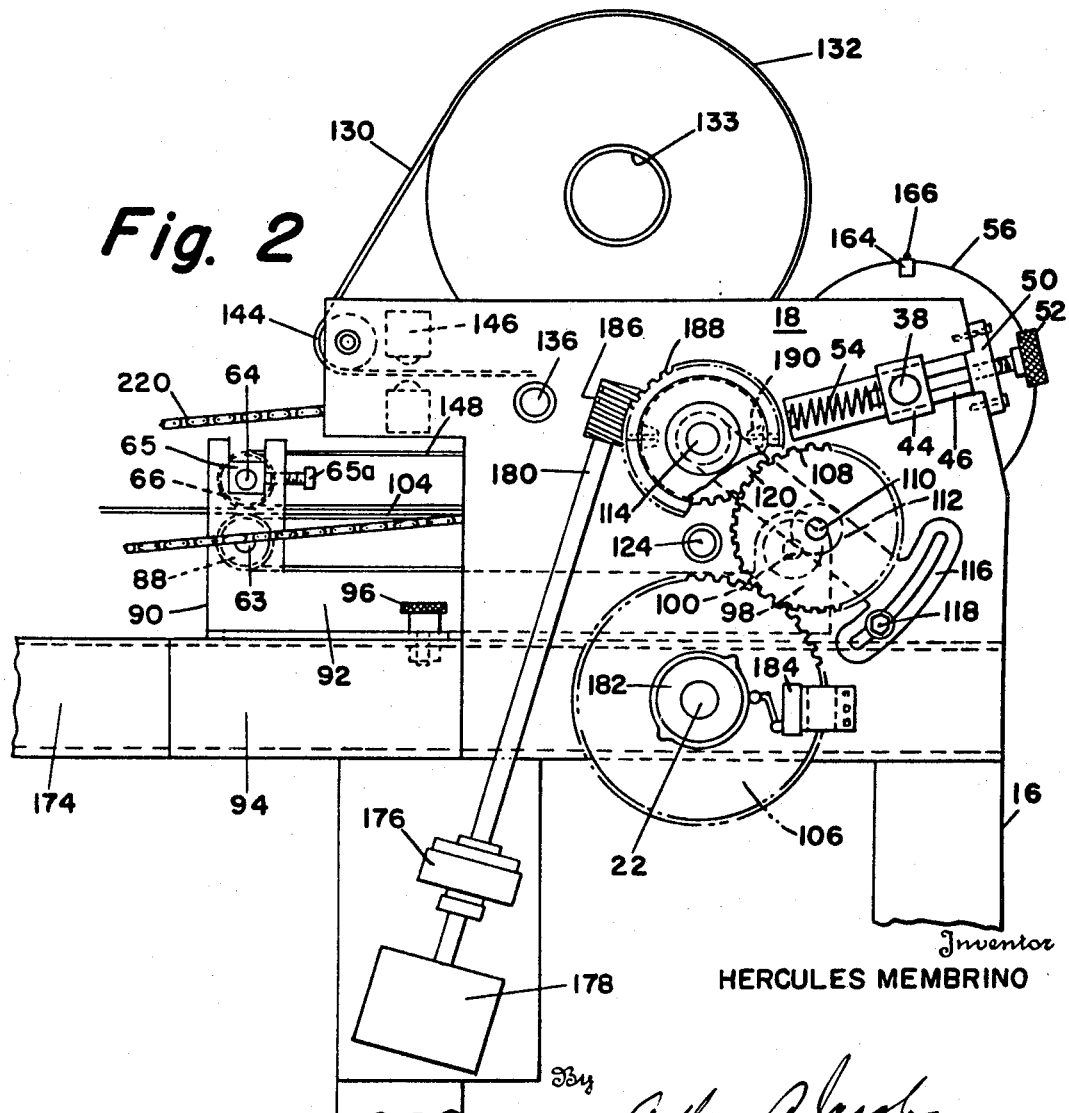
FIG. 2 is an enlarged, detailed, side elevational view of the portion of the machine shown at the right in FIG. 1.
Figure 3:
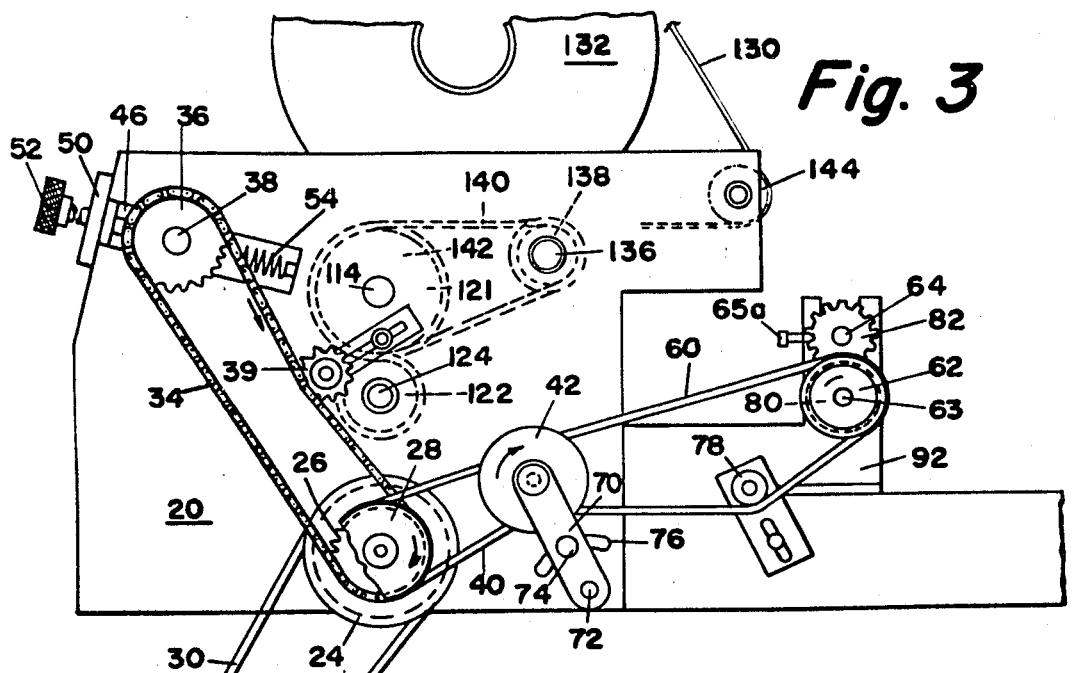
FIG. 3 is a side elevational view of the opposite side of the machine from that shown in FIG. 2.

The mechanism 12 comprises a framework 16 including a side plate 18 (see FIG. 2) and an opposite side plate 20 (see FIG. 3). Between the side plates 18 and 20 extends a main drive shaft 22 having a pulley 24 at one end. Also mounted on the shaft 22 coaxial with pulley 24 is a sprocket 26 and a pulley 28 (see FIG. 3). The pulley 24 is connected by an endles belt 30 to an electric motor 32 while the sprocket 26 is connected by an endless chain 34 to a sprocket 36 mounted on a shaft 38. An adjustable idler sprocket 39 keeps the chain 34 taut. The pulley 28 is connected by an endless belt 40 to a variable speed pulley 42 of standard type such as goes by the name of the "Cleveland Speed Selector."

The shaft 38 is mounted in a pair of bearing blocks 44, one block to each of the side walls 18 and 20. Each block 44 is provided with an upper and a lower groove and is slidable in a slot 46 in the respective side plate, the grooves in the block receiving and being guided by the edges defining these slots. A plate 50 is fastened to each of the plates 18 and 20 in a position to close the respective slot 46. Each plate 50 is provided with a tapped hole through which extends an adjusting screw 52 which holds the respective bearing block 44 against the pressure of a spring 54. This adjusting means is required because the shaft 38 supports a heat sealing head 56 which coacts with an impression roller 58 to heat seal and partially sever bag elements from the strip of plastic stock. In this coaction the sealing head 56 rotates against the plastic strip while it is supported by the roller 58 which, in effect, serves as an anvil. For this purpose, the sealing head 56 must be exactly tangential to the impression roller 58. However, the sealing head 56 must be varied in size in accordance with the size of the bags to be formed. This is accomplished by removing the blocks 44, removing the shaft 38, replacing the sealing head with another of the desired size, replacing the shaft in the blocks 44, replacing the blocks, and then adjusting the blocks to the appropriate positions by means of the respective adjusting screws 52.

The variable speed pulley 42 is connected by an endless belt 60 to a pulley 62 (see FIG. 7) on a shaft 63. Parallel with shaft 63 is a shaft 64 mounted on an adjustable bearing block 65 held in place by a set screw 65A. Coaxially mounted on the shaft 64 are a plurality of sheaves 66 and ribbed rollers 68 (see FIGS. 6 and 7). The variable speed pulley 42 is mounted on a rocker arm 70 which is pivoted at 72 and is provided with a bolt 74 movable in an arcuate slot 76 in the plate 20 (see FIG. 3). By means of this rocker arm 70, the pulley 42 is adjusted to either increase or decrease the speed of the pulley 62. An idler pulley 78 is provided to keep the belt 60 taut at all times.

The shaft 63 is provided with a spur gear 80 which meshes with a spur gear 82 on the shaft 64 above and parallel therewith. The shaft 63 is provided with a series of grooved rollers 86, which mate with the ribbed rollers 68, and with pulleys 88 corresponding in positions to the sheaves 66. Both the shaft 63 and the bearing block 65 are mounted on a support 90 integral with an elongated carriage 92 (see FIG. 2) which is longitudinally adjustable on the bed 94 of the framework 16 and is held in adjusted position by a locking screw 96 extending through a longitudinal slot in the carriage 92. The opposite end of the carriage 92 is provided with a block 98 which supports a shaft 100 on which are mounted a series of pulleys 102 aligned with the pulleys 88. A conveyor belt 104 passes over each pair of pulleys 88 and 102.

Mounted on the main drive shaft 22 is a change gear 106. This gear is removable from the shaft 22, different size gears being used in accordance with the speed desired. The change gear 106 (as best shown in FIG. 2) is in mesh with an intermediate gear 108. This gear 108 is rotatable on a stub shaft 110 which is mounted on a rocker arm 112. The rocker arm 112 is pivoted at its upper end on a shaft 114 which supports the impression roller 58 and at its bottom end the arm 112 is provided with an arcuately slotted shoe 116 which is slidable on a lock screw 118 on the side plate 18. The mounting of the gear 108 on the rocker arm 112 is to permit the gear 108 to be adjusted relative to the change gear 106 so that it is always maintained in mesh with the change gear regardless of the variation in size of the change gear. The lock screw 118 is loosened to permit the rocker arm 112 to be adjusted and is then tightened to maintain the arm in adjusted position.

Figure 5:
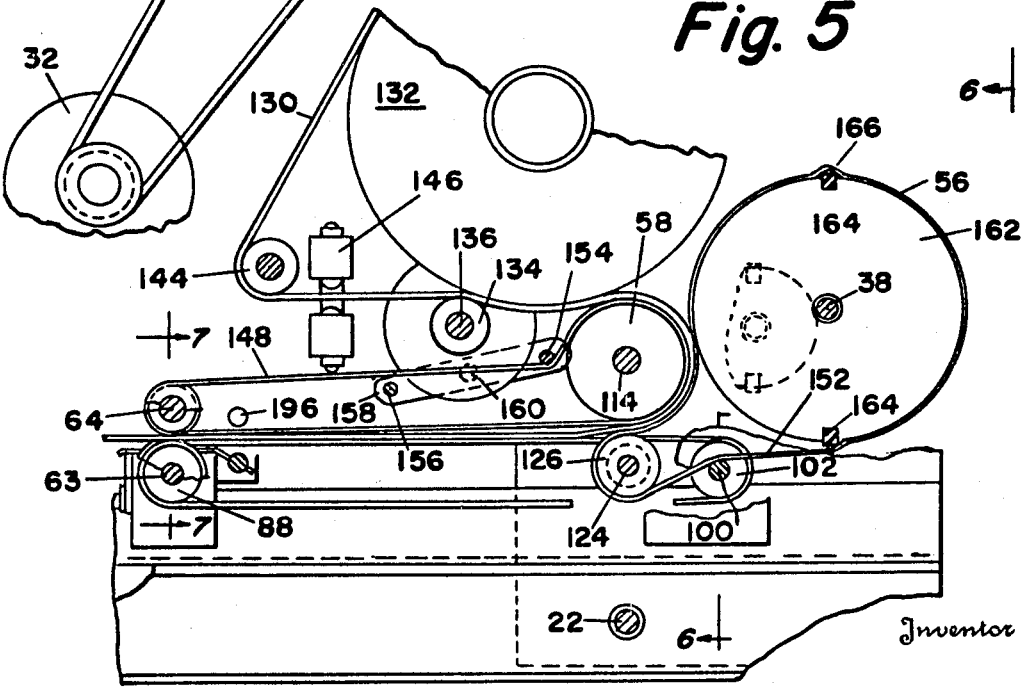
FIG. 5 is a sectional view taken on line 5—5 of FIG. 4.

The intermediate gear 108 is also in mesh with a gear 120 on the shaft 114. In addition, mounted on the shaft 114, is a gear 121 which is in mesh with a gear 122 on a shaft 124 (note FIG. 3). The shaft 124 supports a series of pinch rolls 126 (note FIGS. 5 and 6). The pinch rolls 126 coact with the impression roller 58 to push the partially formed bags onto the conveyor belts 104.

In the embodiment shown, the raw stock is in the form of a sheet or film 130 which has been folded over along a central longitudinal axis so that one half overlies the other with the open edges facing toward the side wall 20. However, it is also feasible and, in some instances, preferable to utilize tubular raw stock with means for slitting one end as it passes through the machine.

Figure 4:
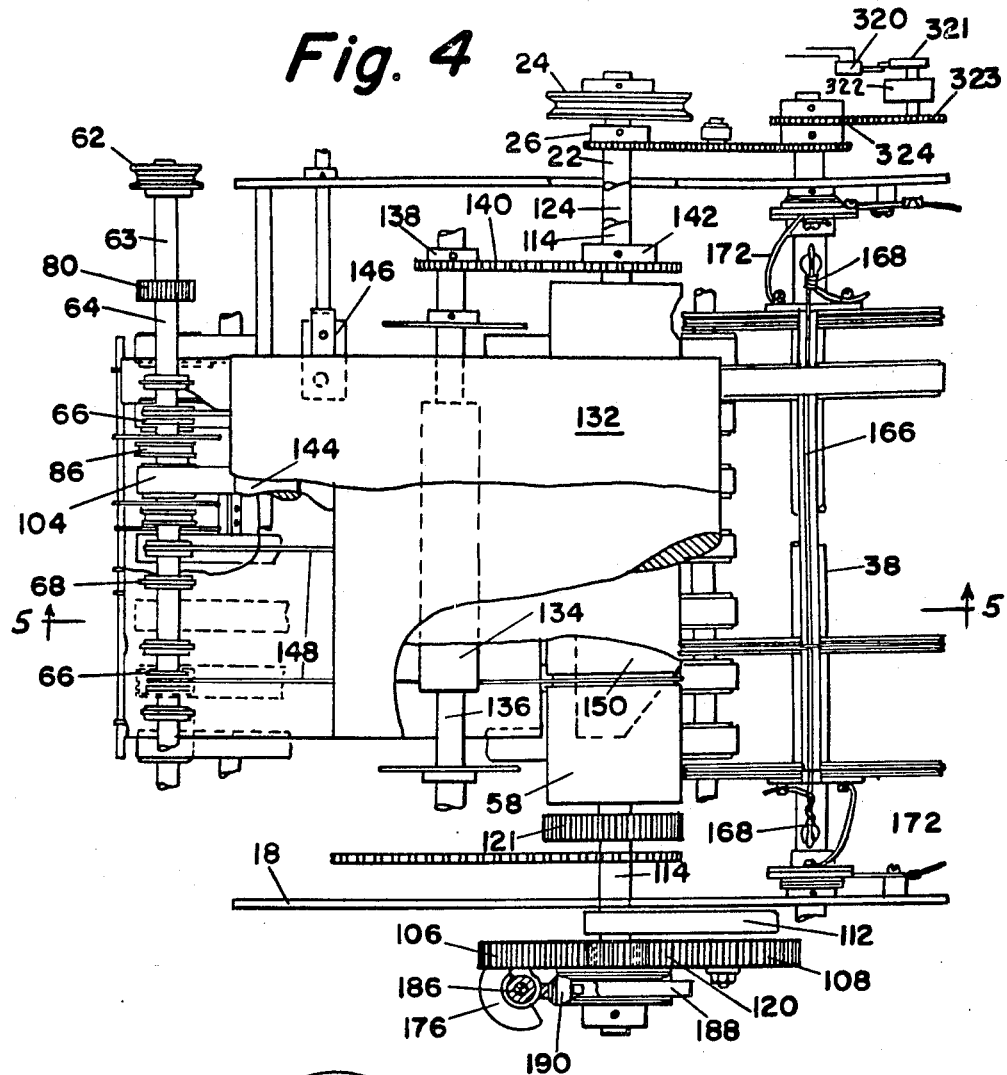
FIG. 4 is a top plan view, with parts broken away, of the mechanism of FIG. 2.

As shown, the strip of folded over sheet material 130 is provided in the form of a supply roll 132 wrapped on a mandrel 133. This supply roll 132 is rotatably supported by the impression roller 58 and by a supporting roll 134 mounted on a shaft 136. The shaft 136 is provided with a sprocket 138 which is connected by a chain 140 to a sprocket 142 mounted on the shaft 114 (note FIGS. 3 and 4), whereby the roll 134 is rotated in synchronism with the impression roller 58.

The strip 130 is drawn from the supply roll 132 around an idler roll 144, between the lamp and sensing element of a photoelectric eye assembly 146, then between the supporting roll 134 and the supply roll, then around the impression roller 58. As it passes between the impression roller and the sealing head 56, the strip is provided with a series of spaced lines of heat seals defining the individual bags. The strip then passes under the impression roller and onto the conveyor belts 104. The pinch rolls 126 here serve as the feed means for pulling the strip off the supply roll.

In order to prevent the strip from wrapping itself around the impression roller 58 a series of parallel endless tapes or cords 148 of heat resistant material, are provided. These tapes 148 extend around the sheaves 66 and around the impression roller 58, being guided by grooves 150 in the impression roller. These tapes 148 cooperate with similar tapes 152 which pass around the discs (hereinafter described) comprising the sealing head 56 and around the rolls 126. These two sets of moving tapes 148 and 152 guide the strip between them onto the conveyor belts 104, the tapes 148 acting to strip the plastic material off the impression roller 58 and the tapes 152 acting to strip the material off the heated sealing elements of the sealing head 56.

The tapes 148 are held in tension between the sheaves 66 and the impression roller 58 by a pair of transverse rods 154 and 156 provided on opposite ends of a lever 158 pivoted at its center to one of the side plates, as at 160. This pivoted lever arrangement is provided so as to maintain the tapes taut regardless of the longitudinal adjustment fo the carriage 92 which varies the position of the sheaves 66 relative to the impression roller 58.

The sealing head 56 comprises a plurality of discs 162 spaced axially from each other along the length of shaft 38. Discs of different radii are adapted to be used, these discs being adjustable toward and away from each other longitudinally of the shaft 38. The purpose for using discs of different radii is to effect varying spaced intervals between the heating wires (hereinafter described). The difference in spacing effects a difference in the width of the bags. In this connection, it should be noted that the radii of the discs must correspond to the radius of the change gear 106. It is also intended that discs of different widths be utilized as desired. In this respect, it should be noted (see FIGS. 4 and 6 especially) that one disc 162 is wider than the other discs. This disc is made wider and is provided with a taper 163 which is wider than the other tapes 152 because in this particular instance it is desired to have a wider unsealed, imperforate portion along one edge of what will eventually become the strip of bags, these tapes acting to prevent heat sealing (in the manner to be presently described).

A pair of heat sealer supporting bars 164, constructed of heat resistant material, extend transversely across the peripheries of the discs 162, these bars 164 being offset from each other by 180° around the perimeters of the discs. An electrical resistance wire 166 constructed of "Nichrome" (an alloy containing 60% nickel, 24% iron, 16% chromium and 0.1% carbon, manufactured by the Driver-Harris Co., Harrison, N.J.) extends longitudinally of each bar 164. Other electrical resistance elements such as a knife or blade may be substituted, if desired.

The ends of each of the sealing wires 166 extend over a brass plate 167 connected to the corresponding disc 162 (note FIG. 6) and are connected to corresponding washers 168 slidable on pins 169 extending from the brass plates. Mounted on each pin 169 is a spring 170 which urges the respective washer 168 outwardly. This keeps the wire 166 taut regardless of the amount of expansion to which it is prone under the influence of heat. The brass plates 167 are in contact with the "Nichrome" wire and are electrically connected to the rotary commutator 171 by wires 172. The commutator 171 is connected to a source of electrical energy, not shown. This forms a short circuit or shunt which keeps most of the electrical current from flowing in the pins 169 and, therefore, keeps the pins and the rest of the machine free from the generated heat.

The tapes 152 and 163, heretofore described, pass through grooves around the peripheries of the respective discs 162 and over the sealing wires 166. Therefore, as the sealing head rotates to bring each sealing wire 166 into heat sealing relation with the longitudinally moving strip 130, the sealing wires act to both cut through and heat seal the strip all along a transverse line except where the tapes 152 and 163 overlie the wires. At these points, there is neither a seal nor a severance so that these areas act as connecting means between the bags. The bags are, therefore, maintained in a linear strip as they move onto the conveyor belts 104.

As the strip of bags pass between the ribbed rollers 68 and grooved rollers 86 (see FIG. 7), the ribs of rollers 68 mate with the grooves of rollers 86 and pinch into the plastic bags, thereby forming rigidifying corrugations in the bags while, at the same time, pulling them through over the table 174 into the finishing mechanism 14. These corrugations subsequently tend to flatten out due to the inherent resilience of the material.

In this embodiment of the machine, where the bags are connected in a strip, the rollers 68 and 86 serve no other purpose and the rollers 68 are adjusted upwardly by moving the bearing block 65 upwardly. However, if it is desired to separate the bags at this point, this can be accomplished by holding the rollers 68 in the operative position (as shown) and adjusting the variable speed pulley 42 so that the rollers 68 and 86 rotate faster than the impression roller 58. This acts to break the small points of connection or nips left by the tapes 152 and 163 between the bags. The bags are, simultaneously, corrugated and fed out by these rollers in the manner-described.

The adjustable carriage 92 finds its primary utility when the bags are to be separated since, in this action, it is necessary that the rollers 68 and 86 be a predetermined distance from the point of contact between the impression roller 58 and the pinch rollers 126, this distance being slightly greater than the width of a bag. The width of the bags, in turn, depends on the radius of the sealing head 56 and the consequent distance between the heat sealing wires 166. Therefore, when a sealing head is replaced by a smaller or larger head, the carriage 92 is correspondingly adjusted so that the rollers 68 and 86 will exert a pull on one edge of each bag while its other edge is just clear of the frictional contact area between the impression roller 58 and the pinch rolls 126.

In many cases the plastic strip material is imprinted with advertising matter or other indicia which is so placed that the design is repeated for each area which is to correspond to an individual bag. The plastic material is stretchable and, as a result, the indicia may move out of register with the sealing elements so that the lines of seal will not be made in the correct places and will cut through the design in each bag. In order to compensate for any such variation, there is provided the aforementioned photoelectric eye assembly 146 (see FIGS. 2 and 5). This photoelectric eye assembly is electrically connected to a magnetic clutch 176 (see FIG. 2) through a switch, not shown. One of the plates of the clutch 176 is connected to a continually running motor 178 and the other is connected to a drive shaft 180. A cam 182 is mounted on the shaft 22 and operates a switch 184 in electrical circuit with the photoelectric eye. This switch 184 must be closed before the photoelectric eye can operate. When the switch 184 is closed, if the photoelectric eye detects an area where there is indicia present on the strip, it closes its switch and, since now the whole circuit is closed, the magnetic clutch is activated to connect the motor 178 to the drive shaft 180.

At the upper end of the shaft 180 is a worm 186 in mesh with a ring gear 188. Connected to the ring gear 188 is a pair of oppositely-disposed beveled gears 190. As best shown in FIG. 8, the beveled gears 190 are positioned between a beveled gear 192 secured to the gear 120 and a beveled gear 194 pinned to the shaft 114. When the shaft 180 is clutched to the motor 178, the motor rotates the shaft 180 and the worm 186 in a direction to cause the ring gear 188 to move the beveled gears 190 in the same direction as the rotation of the shaft 114. This causes the gear 194 to rotate in the opposite direction, thereby slowing down both the impression roller 58 and the pinch roll 126 which feed the bag material from the supply roll. This is a standard type differential gear mechanism.

Since polymeric materials tend to accumulate much static electricity, standard static eliminators, such as is indicated at 196 (see FIG. 5), are provided.

As the strip of bags moves over the table 174 it passes onto an endless belt conveyor 198 (see FIG. 9) comprising an endless belt passing around rollers 200 and 202. The upper flight of the belt 198 is supported by a table 204 which bears the weight of the bags as the various operations are carried out thereon during their passage on the belt conveyor. The rollers 200 and 202, as well as the table 204, are supported by oppositely-disposed channel bars 206 and 208, these channel bars being connected by the table 204. The channel bar 206 is mounted on a plate 210 which is pivoted at 212 to a plate 214 connected to the framework 16, whereas the channel bar 208 rests by its own weight on the framework when in a horizontal position. The entire assembly may be moved from the horizontal position (shown in FIG. 9) to a vertical position by swinging it on the pivot 212. This vertical position is sometimes desirable, as, for example, when the bags are to be filled by gravity feed means.

The roller 200 is a drive roller and its shaft 216 is connected to a sprocket 218 connected by a chain 220 to a sprocket 222 on the shaft 114 (see FIG. 6) for operation of the conveyor 198 in timed relation with the conveyor 104. If desired, a separate drive motor may be used for the shaft 216.

An adjustable stop means 228 is optionally provided at the right hand edge of the table 204, as viewed in FIG. 10, for the purpose of holding the bags in line on the conveyor as they are operated upon by the various mechanisms situated along the opposite edge of the table. Among these mechanisms is a filling device, generally designated 230, which may be any desired type of mechanism for the purpose such as a pusher mounted on an endless belt or a pneumatic or hydraulic ram or even a hand-operated device, constructed and arranged to push filling material into the open ends of the bags as they pass thereby. The conveyor-driven pusher or the ram would be operatively connected to the shaft 22 to be driven in timed relation with the conveyor 198. Alternatively, a person may stand at the filling position and insert the filling material by hand into the bags as they pass.

When tubular stock is used to make the bags, there is no opening through which the bags can be filled. In such instance, an auxiliary device, in the form of a reciprocating knife 232, operated by a solenoid 234, is used at the filling position. The solenoid is operated, in the standard manner, by a switch (not shown) controlled by a cam (not shown) on the shaft 22, in a manner similar to the operation of cam 182 and switch 184. This knife 232 slits the corresponding end of each bag just before it reaches the filling device. In lieu of the solenoid-operated reciprocating knife, a horizontal rotary disc, driven in timed relation with the conveyor 198 and having a knife at one portion of its periphery, may be used.

Parallel with the filling means is an elongated, generally U-shaped tube 238 (best seen in FIG. 12). The two arms of this U-shaped tube are spaced further from each other at the center than at the ends and at least one arm is provided with a series of apertures 240 at the central portion. The tube 238 is in fluid connection with a source of air under pressure (not shown). As the open-ended bags pass into the filling zone, the upper lips of the openings in the bags pass over the upper arm of the tube 238 and the lower lips pass under the lower arm of the tube. This tube thereby acts as a spreader for the openings to make insertion of the filling material easier. The air blown through the apertures 240 penetrates throughout the bags and helps to open them completely. Although not shown, a standard type valve may be interposed in the fluid pressure line to the tube 238 to blow the air in pulses coinciding with the arrival of individual bags at the station. Such a valve would be operated in the ordinary manner by a cam-operated solenoid with the cam operatively connected to the shaft 22 and controlling a switch in the solenoid circuit, similar to the operation of cam 182 and switch 184, described above.

The free ends of the U-shaped tube 238 are supported by a bracket 242 and enclose a block 244 having a wedge-shaped edge 246. The edge 246 acts to sever the small nips 248, left at what will become, after removal of the waste strip hereinafter described, the longitudinal edge of the strip of bags, by the tape 163 passing over the heat sealing elements 166. These nips 248 have several purposes. One purpose is to define the individual bags in the strip; another purpose is to define the open ends for the insertion of the fillers; a third purpose is to act as supporting hangers for the bags when the conveyor 198 and its related parts are moved into the vertical position by pivoting on the hinge 212, the tube 238 acting as the supporting means in this position. However, after the filling has taken place, these nips 248 serve no purpose and, in fact, obstruct further movement. The edge 246 of block 244, therefore, automatically breaks these nips after the bags have been filled.

In order to remove any air in the bags, after they are filled but prior to sealing, a sponge rubber roller 250 is provided. This roller 250, which is preferably slightly inclined in the horizontal plane, bears on the bags and forces the air therein out of the still unsealed filling opening. A suction fan (not shown) is connected to a duct 252 upstream of the roller 250 to aid in exhaustion of the air from the bags.

Downstream of the roller 250 is a heat sealing device 254 comprising a bracket 256 supporting a series of heated, rotatable discs 258. The discs 258 may be heated in any manner desired but are, preferably, electrical resistors coated with Teflon or the like to prevent sticking and to reduce the heat sufficiently to permit welding but not severing of the thermoplastic material. The discs 258 are mounted for rotation on individual electrically conductive shafts 260 which are in electrical circuit with a source of electrical energy (not shown). The discs 258 may either be positively driven by suitable drive connections between the shafts 260 and the main drive shaft 22, or they may rotate merely by friction with the strip of bags. Underlying the bags at the sealing zone is a bed or anvil comprising a steel plate 262, having a rubber coating 264 surmounted by a Teflon covering 266 (see FIG. 11). If desired, a reciprocating heating wire or bar, operated by a solenoid, in the manner described above with regard to other elements, may be substituted for the discs 258.

Downstream of the sealing means 254 is a roller 268, the pressure of which is adjustable by an adjusting screw 270 extending through a supporting bracket 272. This roller 268 flattens the waste strip 274 on the other side of the line of seal and also guides the strip of bags to the packaging zone where a pair of oscillating rollers 276, one on each side of the falling strip, acts to fold the strip of bags into an accordian-like stack of superimposed bags by first pushing one bag in one lateral direction and then the following bag in the opposite direction.

The waste strip 274 may either be removed or may be utilized as the engagement means for the operating mechanism of a bag dispensing unit. In this connection, a series of slots may be provided in the strip 274 to act as sprocket holes to be actuated by a sprocket in the dispensing unit, similar to the film in a camera.

In FIGS. 13 and 14 there is shown a modification of the invention wherein, instead of filling and sealing the bags prior to packaging, the bags are first separated from each other and then packaged in a stack of superimposed bags. In this modification, the raw stock is preferably in the folded-over double-ply form rather than in the tubular form so that each of the resultant bags has an open end.

In this form of the invention, the identical bag-forming mechanism is used as in FIGS. 1–8 above. However, on the downstream side of the roll and sheave assembly is an endless belt conveyor 302 actuated in timed relation with conveyor belts 104. The upper flight of conveyor 302 is supported by a platform 304. A gate 306 is adjustably secured to a support bar 308 by means of a bolt or the like releasably connected to one of the holes 310 in the bar 308. This bar 308 is fixedly connected at 312 to a shaft 314. The shaft 314 is pivotally mounted on the framework, as at 316. The armature of the solenoid 318 is pivotally connected to a lever arm 319 at the end of shaft 314. The solenoid 318 is electrically connected through a microswitch 320 (FIG. 4) actuated by a cam 321 on the output side of a reduction gear box 322 which has a sprocket 323, on the input side, operated by a chain driven by sprocket 324 on the shaft 38. A pair of oppositely-disposed guide plates 326 are adjustably secured to a cross bar 328 by bolts or the like extending through holes 330 in the bar 328.

In this embodiment of the invention, the rollers 68 and 86 are rotated more rapidly than the impression roller 58 to break the nips between the bags and thereby separate the bags, in the manner described above. The separated bags are, simultaneously, pushed onto the conveyor 302, in superimposed relation to each other, by the rolls 68 and 86. At this time the gate 306 retains the stack of superimposed bags against forward movement while the guide plates 326 retain them against lateral movement. Meanwhile, however, the sprocket 324, which here operates on a 25:1 ratio relative to the reduction gearing in the gear box 322, rotates twenty-five times to count fifty bags, each rotation of the heat sealing head forming two bags. At the twenty-fifth rotation, the cam 321 closes the microswitch 320 in the solenoid circuit, thereby actuating the solenoid 318 to rotate the shaft 314 to lift up the gate 306 and permit forward movement of the stack of bags on the conveyor. The microswitch then automatically closes as the cam moves away and the shaft 314 is actuated by gravity to move the gate 306 back into place.

Figure 15:
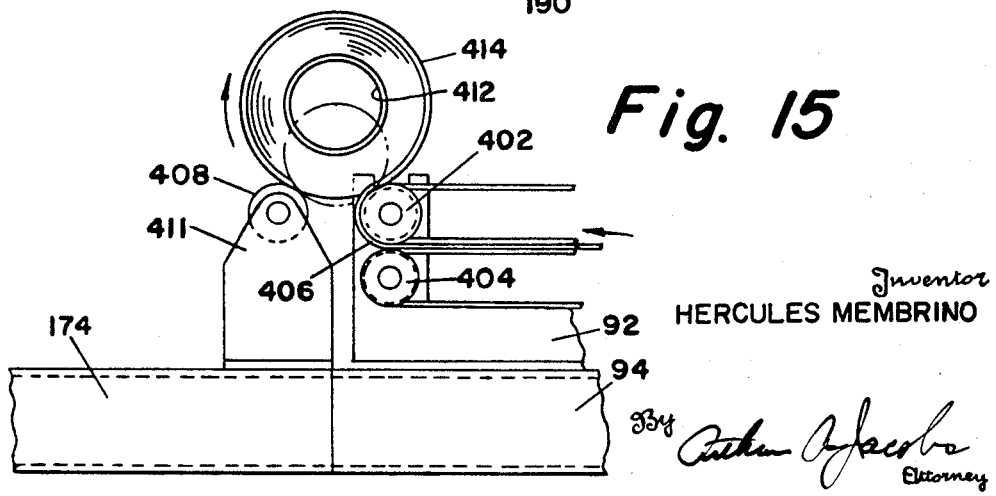
FIG. 15 is a side elevational view showing a modification of the machine wherein the bags are retained in a strip but are rolled up in a roll.

In FIG. 15 is shown a third modification of the invention where all the parts are the same as in the first embodiment except that instead of the sealing and accordian-like packing arrangement, the strip of bags, while open at one end and held together in the strip by the nips therebetween, is wound up in a roll. In this form of the invention, the rollers 402 and 404 are identical to the rollers 68 and 86 in the first embodiment. As the strip of bags, here designated 406, moves out from between the rollers 402 and 404 it passes over a rotary cylinder 408 mounted on a standard 410. The rollers 402 and the cylinder 408 rotatably support a mandrel 412 to which the first bag in the strip is secured. As the strip passes over the cylinder 408, it is wound up on the mandrel 412 into a roll 414 as the mandrel is rotated by the rollers 402 and cylinder 408. This is almost the direct reversal of the unwinding of the strip from the supply roll.

In the forms of the invention above described, the nips formed by the interruptions in the sealing wires not only form connecting means between the otherwise severed bags but, when these nips are eventually broken, there are formed small unsealed areas or holes. These small holes provide vent means which are often desirable. However, where complete sealing is necessary, as when fluid or granular material is being packed, these holes can be sealed by an auxiliary heat seal means provided in the path of movement of the bags upstream of the filling means, this auxiliary sealing means contacting the bags on the upstream side of the interrupted lines of seal and severance and being coated with Teflon or the like so as to provide sufficient heat to weld but not sufficient to completely sever the bags from each other. This sealing means would preferably be a reciprocating type timed with the movement of the conveyor belts 104 in the ordinary manner.

Obviously many modifications and variations of the present invention are possible in the light of the above teachings. It is, therefore, to be understood that within the scope of the appended claims, the invention may be practiced otherwise than as specifically described.

The invention claimed is:

1. In a bag-making machine, a conveyor movable past a plurality of treating stations, said conveyor being constructed and arranged to move a strip of connected bags past said stations, a filling means at the first of said stations, spreader means operatively positioned relative to said filling means for spreading the lips of corresponding filling openings in said bags as said bags arrive at said first of said stations, means at a second station to evacuate air from said bags, means at a third station to seal the open ends of said bags, and means at a fourth station to arrange filled and sealed bags, while connected to each other, said filling means including a slitting means to form said filling openings.

2. A bag-making machine comprising a supporting framework, a rotatable support on said framework for a supply roll of a double-ply thermoplastic strip, means for moving said strip from said supply roll, a single rotatable heat sealing and cutting element and a rotatable impression roller supported by said framework in peripheral tangency to said heat sealing and cutting element, drive means operatively connected to said heat sealing and cutting element and to said impression roller, means for guiding said strip between said element and said impression roller, said element being rotatable to contact said strip at spaced intervals along the length of said strip to form a series of bags, each bag being defined by a closed edge formed by a line of seal and severance transverse to the direction of travel of said strip, each line of seal and severance constituting a substantially closed sealed edge having at least one interruption intermediate its length, each interruption being substantially short relative to the total length of the corresponding sealed edge and forming a connection between adjacent bags, a filling means for filling each of said bags, said filling means being positioned at one side of said strip and being constructed and arranged to insert filler material into each of said bags from one side thereof between the sealed edges thereof in a direction substantially parallel to said lines of seal and severance and while said bags are still connected by said interruptions, conveyor means for moving the strip of bags to said filling means, and means to seal said bags after they are filled.

3. The machine of claim 2 wherein a spreader means is operatively positioned relative to said filling means for spreading the lips of corresponding filling openings in said bags as said bags arrive at said filling means.

4. The machine of claim 2 wherein said filling means comprises a slitting means for cutting openings in said bags when said bags have been formed from a tubular strip, and means for inserting filler material through the openings formed by said slitting means.

5. The machine of claim 2 wherein means are provided for at least partially evacuating the air from the filled bags prior to sealing.

6. The mechanism of claim 1 wherein said spreader means is provided with blower means to blow air into said bags through the filling openings.

7. The mechanism of claim 1 wherein said means to evacuate air from said bags includes a roller arranged to exert rotative pressure on said bags and an exhaust means for carrying evacuated air from said bags.

References Cited

UNITED STATES PATENTS

| | | | |
|---|---|---|---|
| 2,194,451 | 3/1940 | Soubier | 53—28 X |
| 2,565,444 | 8/1951 | Waters | 53—112 |
| 2,612,738 | 10/1952 | Salfisberg | 53—29 |
| 2,633,684 | 4/1953 | Rohdin | 53—112 |
| 3,033,257 | 5/1962 | Weber. | |
| 3,197,936 | 8/1965 | Messmer | 53—29 |

TRAVIS S. McGEHEE, *Primary Examiner.*